(12) United States Patent
Lo et al.

(10) Patent No.: US 10,908,472 B2
(45) Date of Patent: Feb. 2, 2021

(54) ELECTROPHORETIC DISPLAY APPARATUS HAVING A COLOR OF THE COLOR PARTICLES IS DIFFERENT FROM THE COLOR FILTER PATTERNS

(71) Applicant: E Ink Holdings Inc., Hsinchu (TW)

(72) Inventors: Po-Yuan Lo, Hsinchu (TW); Lee-Tyng Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 149 days.

(21) Appl. No.: 15/814,422

(22) Filed: Nov. 16, 2017

(65) Prior Publication Data

US 2018/0246388 A1  Aug. 30, 2018

(30) Foreign Application Priority Data

Feb. 24, 2017 (CN) .......................... 2017 1 0103440

(51) Int. Cl.
*G02F 1/167* (2019.01)
*G09G 3/34* (2006.01)
(Continued)

(52) U.S. Cl.
CPC .......... *G02F 1/167* (2013.01); *G02F 1/13306* (2013.01); *G02F 1/13454* (2013.01);
(Continued)

(58) Field of Classification Search
CPC .... G02F 1/167; G02F 1/1677; G02F 1/13306; G02F 1/13454; G02F 1/133514;
(Continued)

(56) References Cited

U.S. PATENT DOCUMENTS 9,013,783 B2   4/2015 Sprague
9,459,510 B2 * 10/2016 Lin ......................... G02F 1/167
(Continued)

FOREIGN PATENT DOCUMENTS

CN    101002129    7/2007
CN    102338962    2/2012
(Continued)

OTHER PUBLICATIONS

"Office Action of China Counterpart Application", dated Oct. 12, 2020, pp. 1-9.

*Primary Examiner* — Alexander Eisen
*Assistant Examiner* — Nathaniel P Brittingham
(74) *Attorney, Agent, or Firm* — JCIPRNET

(57) ABSTRACT

An electrophoretic display apparatus including a driving array substrate, a color filter layer, and an electrophoretic display film is provided. The driving array substrate has a plurality of display units. The color filter layer is disposed on the driving array substrate. The color filter layer includes a plurality of color filter patterns. Each of the display units corresponds to the color filter patterns of two different colors. The electrophoretic display film is between the driving array substrate and the color filter layer. The electrophoretic display film includes a plurality of display mediums. Each of the display mediums includes an electrophoretic liquid, a plurality of color charged particles, a plurality of black charged particles, and a plurality of white charged particles. A color of the color charged particles is different from colors of the color filter patterns.

21 Claims, 5 Drawing Sheets

(51) Int. Cl.
  *G02F 1/133* (2006.01)
  *G02F 1/1345* (2006.01)
  *G02F 1/1677* (2019.01)
  *G02F 1/1335* (2006.01)
  *G02F 1/1675* (2019.01)

(52) U.S. Cl.
  CPC .......... *G02F 1/1677* (2019.01); *G09G 3/344* (2013.01); *G02F 1/133514* (2013.01); *G02F 2001/1678* (2013.01); *G02F 2201/52* (2013.01); *G09G 2300/0426* (2013.01)

(58) Field of Classification Search
  CPC ........ G02F 2001/1678; G02F 2201/52; G09G 3/344; G09G 2300/0426
  See application file for complete search history.

(56) References Cited

U.S. PATENT DOCUMENTS

| | | | | |
|---|---|---|---|---|
| 2002/0180688 | A1* | 12/2002 | Drzaic | B41J 3/4076 345/107 |
| 2007/0064302 | A1* | 3/2007 | Johnson | G02F 1/167 359/296 |
| 2007/0126695 | A1* | 6/2007 | Kishi | G02F 1/167 345/107 |
| 2008/0272987 | A1* | 11/2008 | Lee | G02F 1/167 345/55 |
| 2010/0103502 | A1* | 4/2010 | Jacobson | B41J 3/4073 359/296 |
| 2010/0276707 | A1* | 11/2010 | Kim | G02F 1/167 257/89 |
| 2012/0013970 | A1* | 1/2012 | Shin | G02F 1/167 359/296 |
| 2012/0134010 | A1 | 5/2012 | Sprague et al. | |
| 2012/0154900 | A1 | 6/2012 | Kim | |
| 2014/0078576 | A1 | 3/2014 | Sprague | |
| 2014/0293398 | A1 | 10/2014 | Wang et al. | |
| 2015/0375400 | A1 | 12/2015 | Kim | |
| 2018/0246388 | A1* | 8/2018 | Lo | G02F 1/167 |

FOREIGN PATENT DOCUMENTS

| | | |
|---|---|---|
| CN | 105324709 | 2/2016 |
| CN | 105807528 | 7/2016 |
| CN | 105900005 | 8/2016 |

* cited by examiner

ELECTROPHORETIC DISPLAY APPARATUS HAVING A COLOR OF THE COLOR PARTICLES IS DIFFERENT FROM THE COLOR FILTER PATTERNS

CROSS-REFERENCE TO RELATED APPLICATION

This application claims the priority benefit of China application serial no. 201710103440.3, filed on Feb. 24, 2017. The entirety of the above-mentioned patent application is hereby incorporated by reference herein and made a part of this specification.

BACKGROUND OF THE INVENTION

Field of the Invention

The invention relates to a display apparatus and more particularly relates to a color electrophoretic display apparatus.

Description of Related Art

E-paper and e-books utilize electrophoretic display technology to achieve the purpose of display. Take a black and white e-book as an example, the display medium is mainly composed of a black electrophoretic liquid and white charged particles mixed into the black electrophoretic liquid, and the white charged particles may be driven to move through application of a voltage, so as to enable the pixels to display black, white, or gray scale respectively.

According to the current technology, most electrophoretic displays achieve the purpose of display by reflecting an external light source and apply a voltage to drive the white charged particles mixed into the electrophoretic liquid for each pixel to display the desired gray scale. In order to expand application of the electrophoretic displays, a color filter film may be further provided on the electrophoretic display film. In that case, the external light passes through the color filter film in the electrophoretic display and then the external light is reflected by the white charged particles in the electrophoretic liquid to pass through the color filter film again, so as to display color.

Generally speaking, the color filter layer is mainly composed of filter patterns of different colors, and the filter pattern of each color corresponds to one pixel unit on the driving array substrate. The electrophoretic display uses white charged particles and black charged particles to absorb and reflect light, and through red, green, and blue filter patterns, displays color images. Nevertheless, the current technology is unable to render specific colors as expected. As a result, rendering of some colors that involves mixture of the specific colors needs to be improved.

SUMMARY OF THE INVENTION

The invention provides an electrophoretic display apparatus that achieves favorable display quality.

The electrophoretic display apparatus of the invention includes a driving array substrate, a color filter layer, and an electrophoretic display film. The driving array substrate has a plurality of display units. The color filter layer is disposed on the driving array substrate. The color filter layer includes a plurality of color filter patterns. Each of the display units corresponds to the color filter patterns of at least two different colors. The electrophoretic display film is disposed between the driving array substrate and the color filter layer. The electrophoretic display film includes a plurality of display mediums. Each of the display mediums includes an electrophoretic liquid, a plurality of color charged particles, a plurality of black charged particles, and a plurality of white charged particles. A color of the color charged particles is different from the colors of the color filter patterns.

In an embodiment of the invention, orthogonal projections of the color filter patterns on the electrophoretic display film overlap a portion of the display mediums and do not overlap another portion of the display mediums.

In an embodiment of the invention, the another portion of the display mediums include a first display medium and a second display medium. One of the display units is driven to display a predetermined color. In the first display medium, the color charged particles are closest to the color filter layer relative to the black charged particles and the white charged particles.

In an embodiment of the invention, the predetermined color is one selected from white, red, yellow, and purple.

In an embodiment of the invention, the predetermined color is one selected from red, yellow, and purple. In the second display medium, the black charged particles are closest to the color filter layer relative to the color charged particles and the white charged particles.

In an embodiment of the invention, the predetermined color is red. The portion of the display mediums include a third display medium and a fourth display medium. In the third display medium and the fourth display medium, the black charged particles are closest to the color filter layer relative to the color charged particles and the white charged particles.

In an embodiment of the invention, the predetermined color is one selected from yellow and purple. The portion of the display mediums include a third display medium and a fourth display medium. In one of the third display medium and the fourth display medium, the black charged particles are closest to the color filter layer relative to the color charged particles and the white charged particles. In the other one of the third display medium and the fourth display medium, the white charged particles are closest to the color filter layer relative to the color charged particles and the black charged particles.

In an embodiment of the invention, the predetermined color is yellow. In the third display medium, the white charged particles are closest to the color filter layer relative to the color charged particles and the black charged particles. In the fourth display medium, the black charged particles are closest to the color filter layer relative to the color charged particles and the white charged particles.

In an embodiment of the invention, the predetermined color is purple. In the third display medium, the black charged particles are closest to the color filter layer relative to the color charged particles and the white charged particles. In the fourth display medium, the white charged particles are closest to the color filter layer relative to the color charged particles and the black charged particles.

In an embodiment of the invention, the predetermined color is white. In the second display medium, the white charged particles are closest to the color filter layer relative to the color charged particles and the black charged particles.

In an embodiment of the invention, the portion of the display mediums include a third display medium and a fourth display medium. In the third display medium and the fourth display medium, the white charged particles are closest to the color filter layer relative to the color charged particles and the black charged particles.

In an embodiment of the invention, the portion of the display mediums include a third display medium and a fourth display medium. The third display medium corresponds to the color filter pattern of green and the fourth display medium corresponds to the color filter pattern of blue.

In an embodiment of the invention, the another portion of the display mediums include a first display medium and a second display medium. One of the display units is driven to display a predetermined color. In the first display medium and the second display medium, the black charged particles are closest to the color filter layer relative to the color charged particles and the white charged particles.

In an embodiment of the invention, the predetermined color is one selected from blue, green, and cyan.

In an embodiment of the invention, the predetermined color is one selected from blue and green. The portion of the display mediums include a third display medium and a fourth display medium. In one of the third display medium and the fourth display medium, the black charged particles are closest to the color filter layer relative to the color charged particles and the white charged particles. In the other one of the third display medium and the fourth display medium, the white charged particles are closest to the color filter layer relative to the color charged particles and the black charged particles.

In an embodiment of the invention, the predetermined color is green. In the third display medium, the white charged particles are closest to the color filter layer relative to the color charged particles and the black charged particles. In the fourth display medium, the black charged particles are closest to the color filter layer relative to the color charged particles and the white charged particles.

In an embodiment of the invention, the predetermined color is blue. In the third display medium, the black charged particles are closest to the color filter layer relative to the color charged particles and the white charged particles. In the fourth display medium, the white charged particles are closest to the color filter layer relative to the color charged particles and the black charged particles.

In an embodiment of the invention, the predetermined color is cyan. The portion of the display mediums include a third display medium and a fourth display medium. In the third display medium and the fourth display medium, the white charged particles are closest to the color filter layer relative to the color charged particles and the black charged particles.

In an embodiment of the invention, the portion of the display mediums include a third display medium and a fourth display medium. The color charged particles are red charged particles, and the third display medium corresponds to the color filter pattern of green and the fourth display medium corresponds to the color filter pattern of blue.

In an embodiment of the invention, the color of the color charged particles is one selected from red, blue, and green while the colors of the color filter patterns are the other two selected from red, blue, and green.

Based on the above, in the exemplary embodiments of the invention, the display mediums include black, white, and color charged particles in coordination with the color filter patterns that have different colors from the color charged particles, so as to improve the optical characteristics of the color of the electrophoretic display apparatus. Therefore, the electrophoretic display apparatus achieves favorable display quality.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
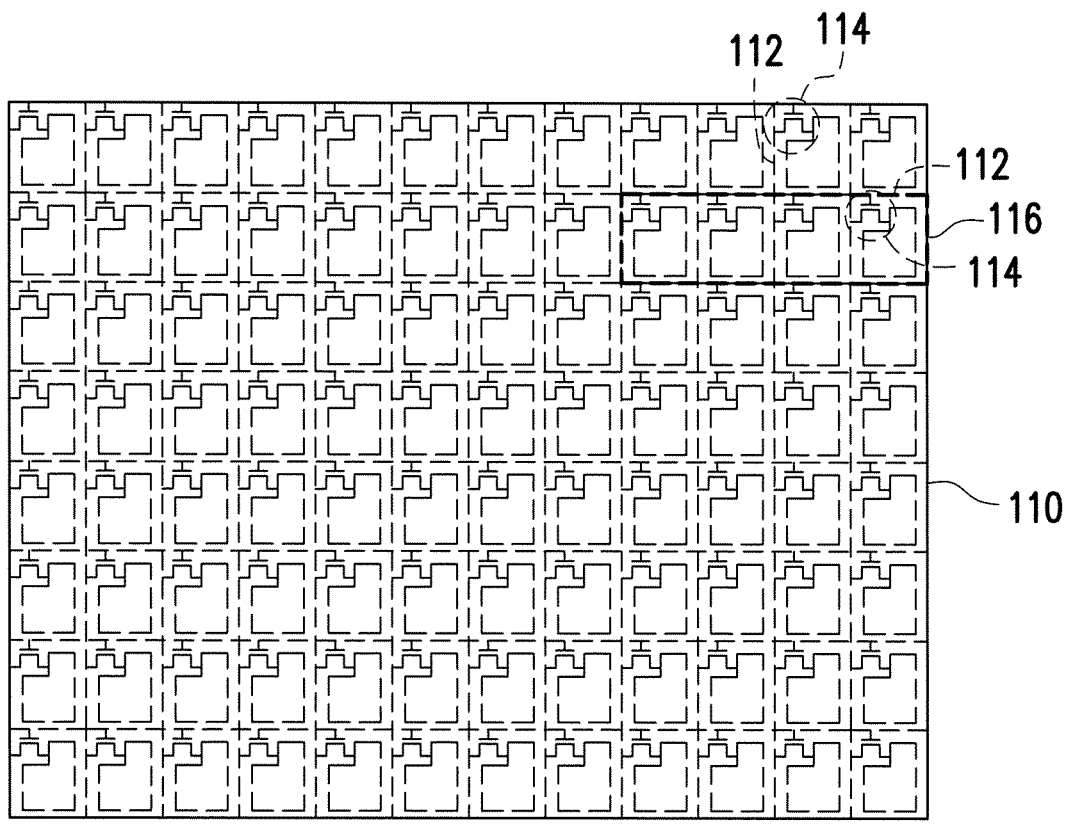
FIG. 1 is a schematic top view of a portion of an electrophoretic display apparatus according to an embodiment of the invention.
Figure 2:
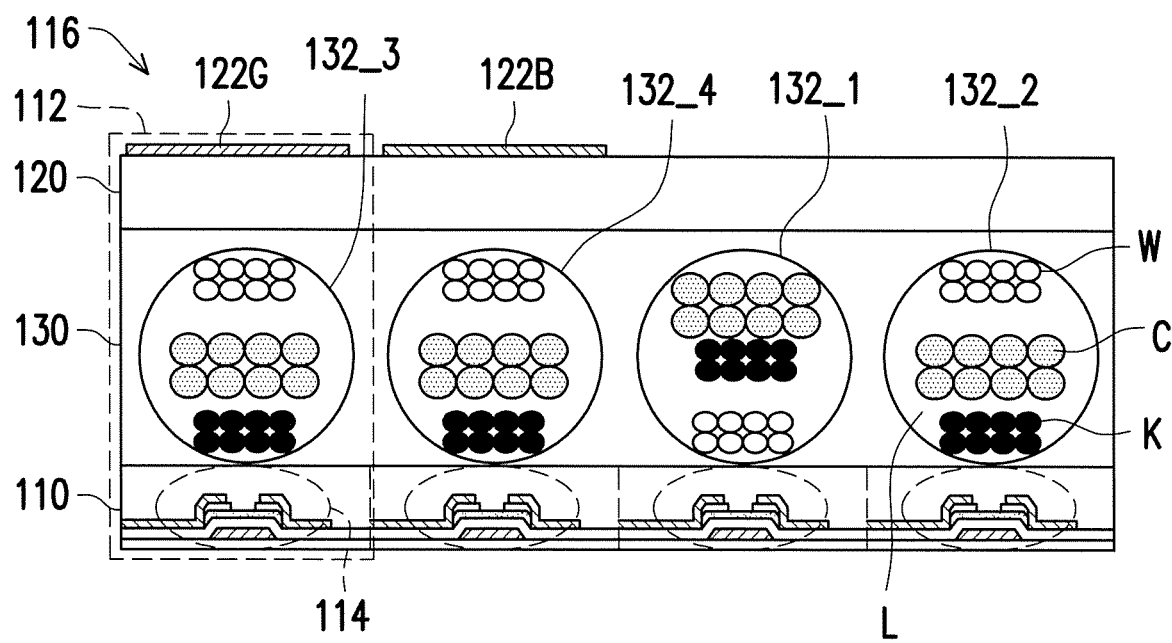
FIG. 2 is a schematic cross-sectional view of a display unit, which displays white, according to the embodiment of FIG. 1.

FIG. 1 is a schematic top view of a portion of an electrophoretic display apparatus according to an embodiment of the invention. FIG. 2 is a schematic cross-sectional view of a display unit, which displays white, according to the embodiment of FIG. 1. For the sake of convenience, certain elements are omitted from FIG. 1. Referring to FIG. 1 and FIG. 2, an electrophoretic display apparatus 100 of this embodiment includes a driving array substrate 110, a color filter layer 120, and an electrophoretic display film 130.

In this embodiment, the driving array substrate 110 has a plurality of display units 116. Each of the display units 116 includes a plurality of pixel units 112, the number of which is 4, for example. Each of the pixel units 112 includes a driving transistor 114. In this embodiment, the number of the pixel units 112 included in each of the display units 116 and the number of the driving transistors 114 included in each of the pixel units 112 are merely examples and should not be construed as limitations to the invention. The color filter layer 120 is disposed on the driving array substrate 110. The color filter layer 120 includes a plurality of color filter patterns 122G and 122B disposed thereon. In an embodiment, each of the color filter patterns may correspond to at least two pixel units 112. The electrophoretic display film 130 is disposed between the driving array substrate 110 and the color filter layer 120. The electrophoretic display film 130 includes a plurality of display mediums 132_1 to 132_4. Each of the display mediums 132 includes an electrophoretic liquid L, a plurality of color charged particles C, a plurality of black charged particles K, and a plurality of white charged particles W. The color charged particles C, the black charged particles K, and the white charged particles W are distributed in the electrophoretic liquid L.

In this embodiment, each of the display units 116 corresponds to the color filter patterns 122G and 122B of at least two different colors. A color of the color charged particles C is different from the colors of the color filter patterns 122G and 122B. For example, the color filter patterns 122G and 122B are green and blue respectively while the color charged particles C are red. In an embodiment, the color of the color charged particles C may be one selected from green and blue, for example. Corresponding to the color of the color charged particles C, the colors of the color filter patterns 122G and 122B are selected from a combination of red and blue or a combination of green and red, for example. In other words, the color of the color charged particles C is one selected from red, blue, and green while the colors of the color filter patterns 122G and 122B are the other two selected from red, blue, and green. In this embodiment, the driving transistor 114 is for driving the charged particles to move, so as to enable each of the display units 116 to display a predetermined color, e.g., white, blue, green, red, yellow, purple, or cyan. Nevertheless, the color displayed by each of the display units 116 of the invention is not limited to the aforementioned colors. In an embodiment, the display medium 132 may be controlled by at least two driving transistors 114.

In this embodiment, the driving array substrate 110 is a thin film transistor array substrate, and the driving transistor 114 is a thin film transistor (TFT) and is a bottom gate TFT as shown in FIG. 2. In other embodiments not illustrated here, the driving transistor 114 may also be a top-gate TFT. Nevertheless, the invention is not limited thereto. Moreover, the color filter layer 120 of this embodiment may include a flexible substrate, and a material thereof is poly-ethylene tetrephthalate (PET), for example.

In this embodiment, orthogonal projections of the color filter patterns 122G and 122B on the electrophoretic display film 130 overlap a portion of the display mediums and do not overlap another portion of the display mediums. For example, the orthogonal projection of the color filter pattern 122G on the electrophoretic display film 130 overlaps the display medium 132_3 and does not overlap the display mediums 132_1, 132_2, and 132_4. The orthogonal projection of the color filter pattern 122B on the electrophoretic display film 130 overlaps the display medium 132_4 and does not overlap the display mediums 132_1, 132_2, and 132_3. In this embodiment, no corresponding color filter patterns are disposed on the display mediums 132_1 and 132_2.

In the embodiment of FIG. 2, the driving transistor 114 drives the display unit 116 to display white, for example. In the display medium 132_1 (first display medium), the color charged particles C are closest to the color filter layer 120 relative to the white charged particles W and the black charged particles K. In the display medium 132_2 (second display medium), the white charged particles W are closest to the color filter layer 120 relative to the color charged particles C and the black charged particles K. In the display medium 132_3 (third display medium), the white charged particles W are closest to the color filter layer 120 relative to the color charged particles C and the black charged particles K. In the display medium 132_4 (fourth display medium), the white charged particles W are closest to the color filter layer 120 relative to the color charged particles C and the black charged particles K. Therefore, the pixel units 112 in the display unit 116 respectively display green, blue, red, and white sequentially from left to right, such that the overall display unit 116 displays white.

Figure 3:
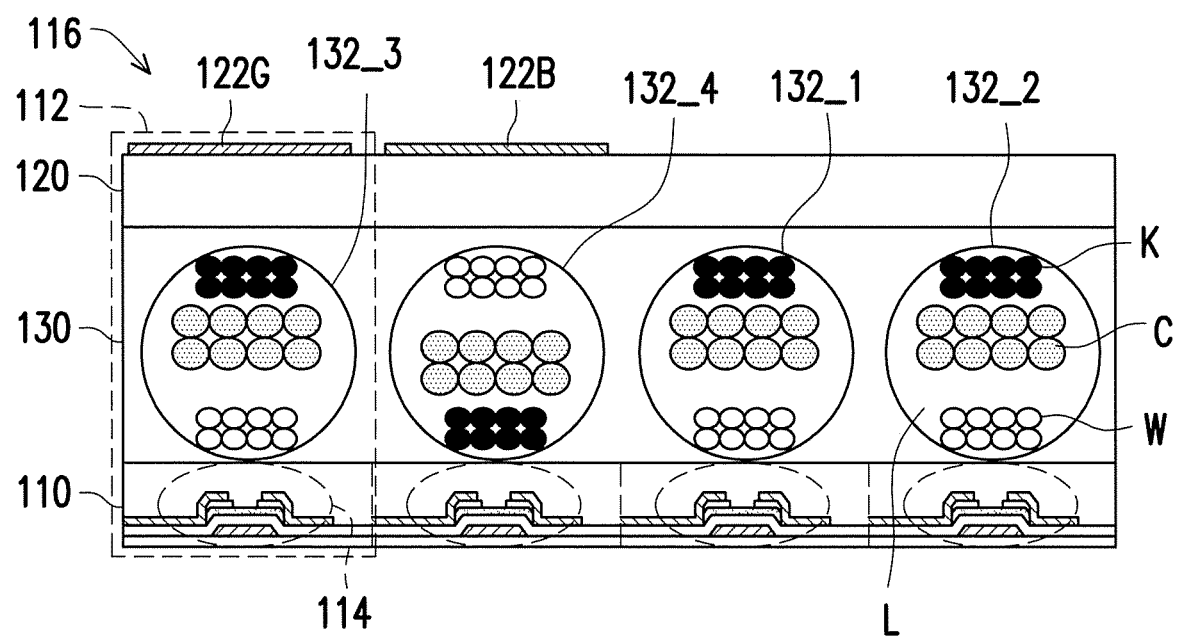
FIG. 3 is a schematic cross-sectional view of a display unit, which displays blue, according to the embodiment of FIG. 1.

FIG. 3 is a schematic cross-sectional view of a display unit, which displays blue, according to the embodiment of FIG. 1. Referring to FIG. 1 and FIG. 3, in the embodiment of FIG. 3, the driving transistor 114 drives the display unit 116 to display blue, for example. In the display medium 132_1, the black charged particles K are closest to the color filter layer 120 relative to the color charged particles C and the white charged particles W; in the display medium 132_2, the black charged particles K are closest to the color filter layer 120; in the display medium 132_3, the black charged particles K are closest to the color filter layer 120; and in the display medium 132_4, the white charged particles W are closest to the color filter layer 120. Therefore, the pixel units 112 in the display unit 116 respectively display black, blue, black, and black sequentially from left to right, such that the overall display unit 116 displays blue.

Figure 4:
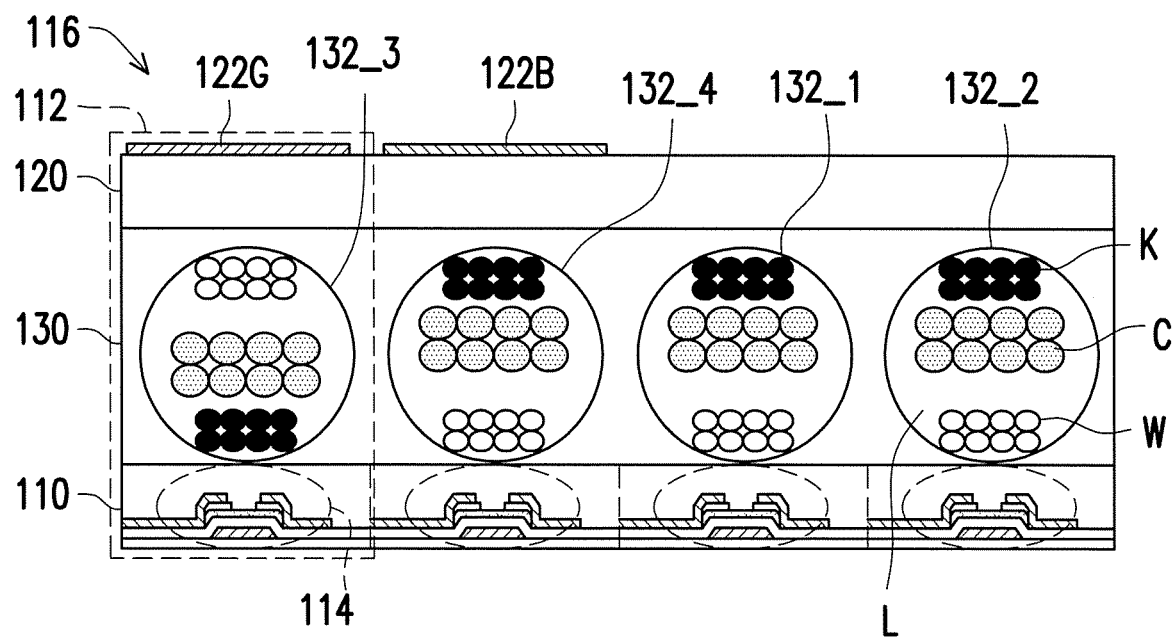
FIG. 4 is a schematic cross-sectional view of a display unit, which displays green, according to the embodiment of FIG. 1.

FIG. 4 is a schematic cross-sectional view of a display unit, which displays green, according to the embodiment of FIG. 1. Referring to FIG. 1 and FIG. 4, in the embodiment of FIG. 4, the driving transistor 114 drives the display unit 116 to display green, for example. A difference between the embodiments of FIG. 2 and FIG. 3 is that: in the display medium 132_1, the black charged particles K are closest to the color filter layer 120; in the display medium 132_2, the black charged particles K are closest to the color filter layer 120; in the display medium 132_3, the white charged particles W are closest to the color filter layer 120; and in the display medium 132_4, the black charged particles K are closest to the color filter layer 120. Therefore, the pixel units 112 in the display unit 116 respectively display green, black, black, and black sequentially from left to right, such that the overall display unit 116 displays green.

Figure 5:
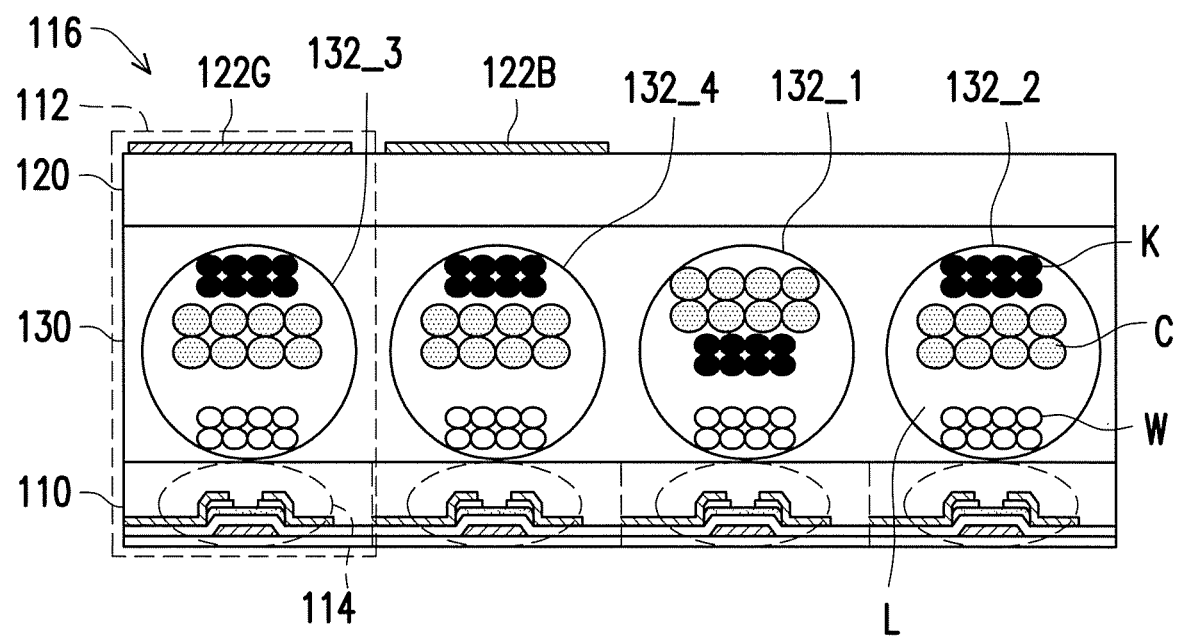
FIG. 5 is a schematic cross-sectional view of a display unit, which displays red, according to the embodiment of FIG. 1.

FIG. 5 is a schematic cross-sectional view of a display unit, which displays red, according to the embodiment of FIG. 1. Referring to FIG. 1 and FIG. 5, in the embodiment of FIG. 5, the driving transistor 114 drives the display unit 116 to display red, for example. In brief, according to this embodiment, in the display medium 132_1, the color charged particles C are closest to the color filter layer 120; in the display medium 132_2, the black charged particles K are closest to the color filter layer 120; in the display medium 132_3, the black charged particles K are closest to the color filter layer 120; and in the display medium 132_4, the black charged particles K are closest to the color filter layer 120. Therefore, the pixel units 112 in the display unit 116 respectively display black, black, red, and black sequentially from left to right, such that the overall display unit 116 displays red.

Figure 6:
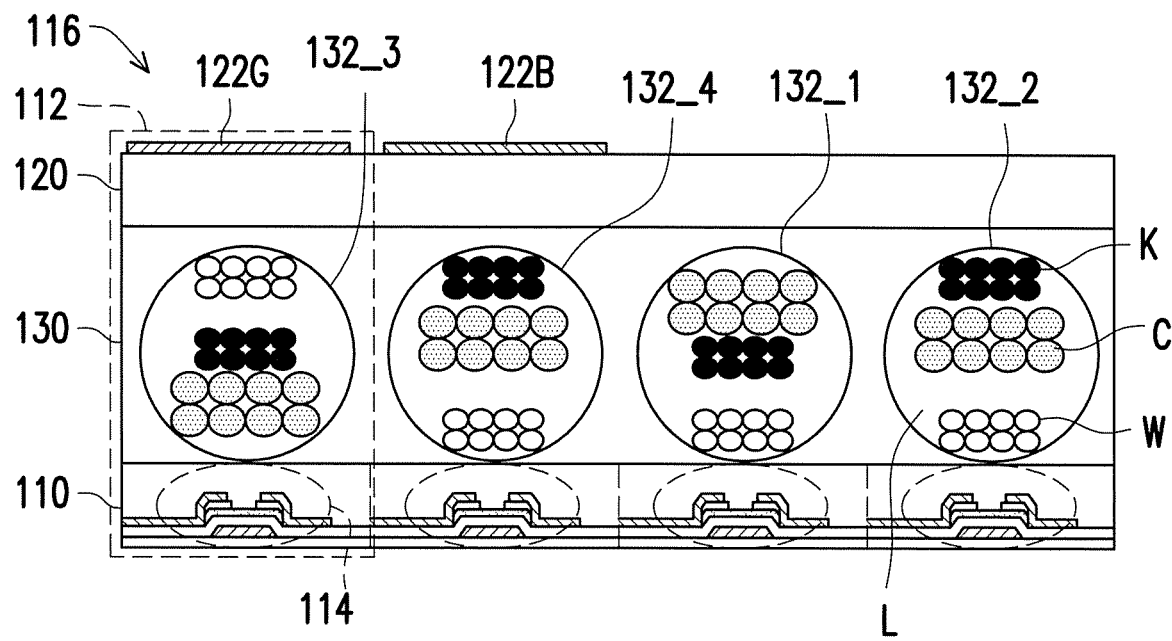
FIG. 6 is a schematic cross-sectional view of a display unit, which displays yellow, according to the embodiment of FIG. 1.

FIG. 6 is a schematic cross-sectional view of a display unit, which displays yellow, according to the embodiment of FIG. 1. Referring to FIG. 1 and FIG. 6, in the embodiment of FIG. 6, the driving transistor 114 drives the display unit 116 to display yellow, for example. In the display mediums 132_1, 132_2, 132_3, and 132_4, sequentially the color charged particles C, the black charged particles K, the white charged particles W, and the black charged particles K are closest to the color filter layer 120. Therefore, the pixel units 112 in the display unit 116 respectively display green, black, red, and black sequentially from left to right, such that the overall display unit 116 displays yellow.

Figure 7:
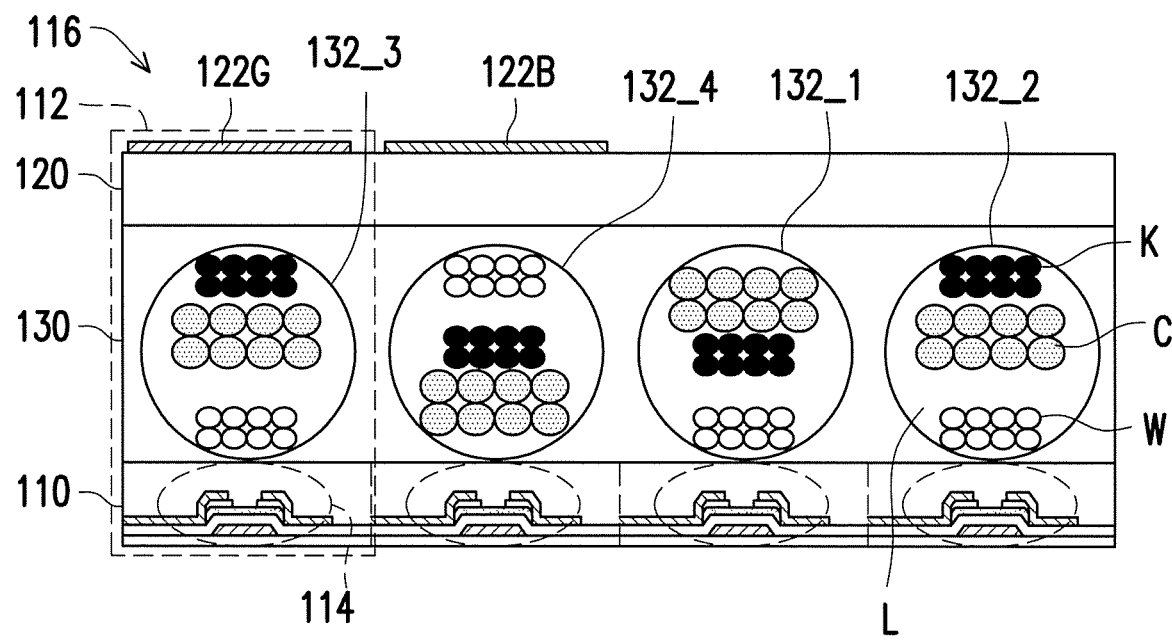
FIG. 7 is a schematic cross-sectional view of a display unit, which displays purple, according to the embodiment of FIG. 1.

FIG. 7 is a schematic cross-sectional view of a display unit, which displays purple, according to the embodiment of FIG. 1. Referring to FIG. 1 and FIG. 7, in the embodiment of FIG. 7, the driving transistor 114 drives the display unit 116 to display purple, for example. That is, in the display mediums 132_1, 132_2, 132_3, and 132_4, sequentially the color charged particles C, the black charged particles K, the black charged particles K, and the white charged particles W are closest to the color filter layer 120. Therefore, the pixel units 112 in the display unit 116 respectively display black, blue, red, and black sequentially from left to right, such that the overall display unit 116 displays purple.

Figure 8:
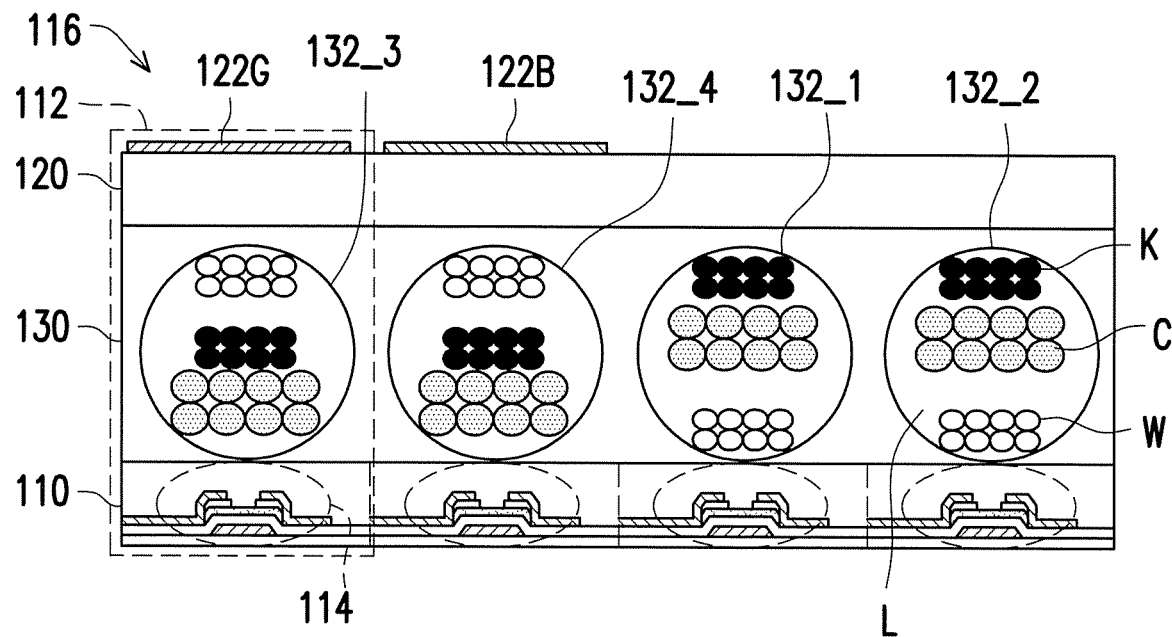
FIG. 8 is a schematic cross-sectional view of a display unit, which displays cyan, according to the embodiment of FIG. 1.

FIG. 8 is a schematic cross-sectional view of a display unit, which displays cyan, according to the embodiment of FIG. 1. Referring to FIG. 1 and FIG. 8, in the embodiment of FIG. 8, the driving transistor 114 drives the display unit 116 to display cyan, for example. That is, in the display mediums 132_1, 132_2, 132_3, and 132_4, sequentially the black charged particles K, the black charged particles K, the white charged particles W, and the white charged particles W are closest to the color filter layer 120. Therefore, the pixel units 112 in the display unit 116 respectively display green, blue, black, and black sequentially from left to right, such that the overall display unit 116 displays cyan.

The cross-sectional structures and color combinations of the display unit described in the exemplary embodiments of FIG. 2 to FIG. 8 are merely examples and should not be construed as limitations to the invention. Those skilled in the art may combine structures of other display units with the electrophoretic display apparatus described in the exemplary embodiments of the invention, and implementation thereof can be understood sufficiently from the teaching, suggestion, and illustration of the common knowledge of this field. Thus, details thereof are not repeated hereinafter.

Figure 9:
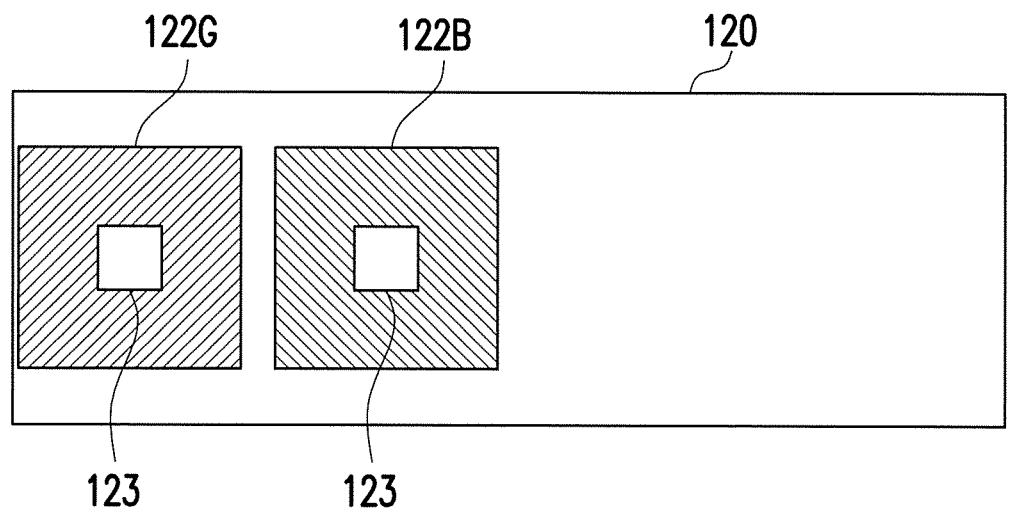
FIG. 9 is a schematic top view of a color filter layer according to an embodiment of the invention.

FIG. 9 is a schematic top view of a color filter layer according to an embodiment of the invention. FIG. 9 is a schematic top view of the color filter layer 120 shown in FIG. 2 to FIG. 8, for example. For the purpose of illustration, each color filter pattern area in the color filter layer may not be filled with a filter material. In this embodiment, for example, the color filter patterns 122G and 122B are hollow filter patterns as shown in FIG. 9. The color filter patterns 122G and 122B do not have the filter material in central portions 123 thereof. Thus, light is allowed to pass through the central portions 123, so as to improve contrast of the electrophoretic display apparatus 100. In an embodiment, the color filter patterns 122G and 122B may have the filter material in the central portions 123. Nevertheless, the invention is not limited thereto. Moreover, the geometric shape of the filter patterns shown in FIG. 9 is merely an example and should not be construed as a limitation to the invention. That is, the shapes and the number of the hollow areas of the filter patterns may be varied depending on the design.

To conclude the above, in the exemplary embodiments of the invention, the display mediums include black, white, and color charged particles. The color of the color charged particles is one selected from red, blue, and green. The colors of the color filter patterns are the other two selected from red, blue, and green to be different from the color of the color charged particles. The driving transistor drives the charged particles to move to enable the pixel units to display different colors, such that the overall display unit displays the predetermined color. Thereby, the optical characteristics of the color of the electrophoretic display apparatus are improved. Therefore, the electrophoretic display apparatus achieves favorable display quality.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An electrophoretic display apparatus, comprising:
a driving array substrate comprising a plurality of display units, wherein each of the plurality of display units includes a first pixel unit, a second pixel unit and a third pixel unit;
a color filter layer disposed on the driving array substrate and comprising a plurality of color filter patterns, wherein the first pixel unit and the second pixel unit of each of the display units corresponds to the color filter patterns of at least two different colors and no color filter pattern is disposed on the third pixel unit of the each of the display units; and
an electrophoretic display film disposed between the driving array substrate and the color filter layer and comprising a plurality of display mediums, wherein each of the display mediums comprises an electrophoretic liquid, a plurality of color charged particles, a plurality of black charged particles, and a plurality of white charged particles,
wherein a color of the color charged particles corresponding to the third pixel unit is different from the colors of the color filter patterns.

2. The electrophoretic display apparatus according to claim 1, wherein orthogonal projections of the color filter patterns on the electrophoretic display film overlap a portion of the display mediums and do not overlap another portion of the display mediums.

3. The electrophoretic display apparatus according to claim 2, wherein the another portion of the display mediums comprise a first display medium and a second display medium, and one of the display units is driven to display a predetermined color, wherein in the first display medium, the color charged particles are closest to the color filter layer relative to the black charged particles and the white charged particles.

4. The electrophoretic display apparatus according to claim 3, wherein the predetermined color is one selected from white, red, yellow, and purple.

5. The electrophoretic display apparatus according to claim 4, wherein the predetermined color is one selected from red, yellow, and purple, and in the second display medium, the black charged particles are closest to the color filter layer relative to the color charged particles and the white charged particles.

6. The electrophoretic display apparatus according to claim 5, wherein the predetermined color is red, and the portion of the display mediums comprise a third display medium and a fourth display medium, wherein in the third display medium and the fourth display medium, the black charged particles are closest to the color filter layer relative to the color charged particles and the white charged particles.

7. The electrophoretic display apparatus according to claim 5, wherein the predetermined color is one selected from yellow and purple, and the portion of the display mediums comprise a third display medium and a fourth display medium, wherein in one of the third display medium and the fourth display medium, the black charged particles are closest to the color filter layer relative to the color charged particles and the white charged particles, and in the other one of the third display medium and the fourth display medium, the white charged particles are closest to the color filter layer relative to the color charged particles and the black charged particles.

8. The electrophoretic display apparatus according to claim 7, wherein the predetermined color is yellow, wherein in the third display medium, the white charged particles are closest to the color filter layer relative to the color charged particles and the black charged particles, and in the fourth display medium, the black charged particles are closest to the color filter layer relative to the color charged particles and the white charged particles.

9. The electrophoretic display apparatus according to claim 7, wherein the predetermined color is purple, wherein in the third display medium, the black charged particles are closest to the color filter layer relative to the color charged particles and the white charged particles, and in the fourth display medium, the white charged particles are closest to the color filter layer relative to the color charged particles and the black charged particles.

10. The electrophoretic display apparatus according to claim 4, wherein the predetermined color is white, and in the second display medium, the white charged particles are closest to the color filter layer relative to the color charged particles and the black charged particles.

11. The electrophoretic display apparatus according to claim 10, wherein the portion of the display mediums comprise a third display medium and a fourth display medium, wherein in the third display medium and the fourth display medium, the white charged particles are closest to the color filter layer relative to the color charged particles and the black charged particles.

12. The electrophoretic display apparatus according to claim 3, wherein the portion of the display mediums comprise a third display medium and a fourth display medium, wherein the third display medium corresponds to the color filter pattern of green and the fourth display medium corresponds to the color filter pattern of blue.

13. The electrophoretic display apparatus according to claim 2, wherein the another portion of the display mediums comprise a first display medium and a second display medium, and one of the display units is driven to display a predetermined color, wherein in the first display medium and the second display medium, the black charged particles are closest to the color filter layer relative to the color charged particles and the white charged particles.

14. The electrophoretic display apparatus according to claim 13, wherein the predetermined color is one selected from blue, green, and cyan.

15. The electrophoretic display apparatus according to claim 14, wherein the predetermined color is one selected from blue and green, and the portion of the display mediums comprise a third display medium and a fourth display medium, wherein in one of the third display medium and the fourth display medium, the black charged particles are closest to the color filter layer relative to the color charged particles and the white charged particles, and in the other one of the third display medium and the fourth display medium, the white charged particles are closest to the color filter layer relative to the color charged particles and the black charged particles.

16. The electrophoretic display apparatus according to claim 15, wherein the predetermined color is green, wherein in the third display medium, the white charged particles are closest to the color filter layer relative to the color charged particles and the black charged particles, and in the fourth display medium, the black charged particles are closest to the color filter layer relative to the color charged particles and the white charged particles.

17. The electrophoretic display apparatus according to claim 15, wherein the predetermined color is blue, wherein in the third display medium, the black charged particles are closest to the color filter layer relative to the color charged particles and the white charged particles, and in the fourth display medium, the white charged particles are closest to the color filter layer relative to the color charged particles and the black charged particles.

18. The electrophoretic display apparatus according to claim 14, wherein the predetermined color is cyan, and the portion of the display mediums comprise a third display medium and a fourth display medium, wherein in the third display medium and the fourth display medium, the white charged particles are closest to the color filter layer relative to the color charged particles and the black charged particles.

19. The electrophoretic display apparatus according to claim 13, wherein the portion of the display mediums comprise a third display medium and a fourth display medium, and the color charged particles are red charged particles, wherein the third display medium corresponds to the color filter pattern of green and the fourth display medium corresponds to the color filter pattern of blue.

20. The electrophoretic display apparatus according to claim 1, wherein the color of the color charged particles is one selected from red, blue, and green while the colors of the color filter patterns are the other two selected from red, blue, and green.

21. The electrophoretic display apparatus according to claim 1, wherein at least one of the color filter patterns is not completely filled with a filter material.

* * * * *